POWER-OPERATED HAIR BRUSH

Original Filed Dec. 14, 1962 3 Sheets-Sheet 1

INVENTORS
William D. Taylor
LeRoy W. Crookes
BY Connolly and Hutz
ATTORNEYS

POWER-OPERATED HAIR BRUSH
Original Filed Dec. 14, 1962 3 Sheets-Sheet 2
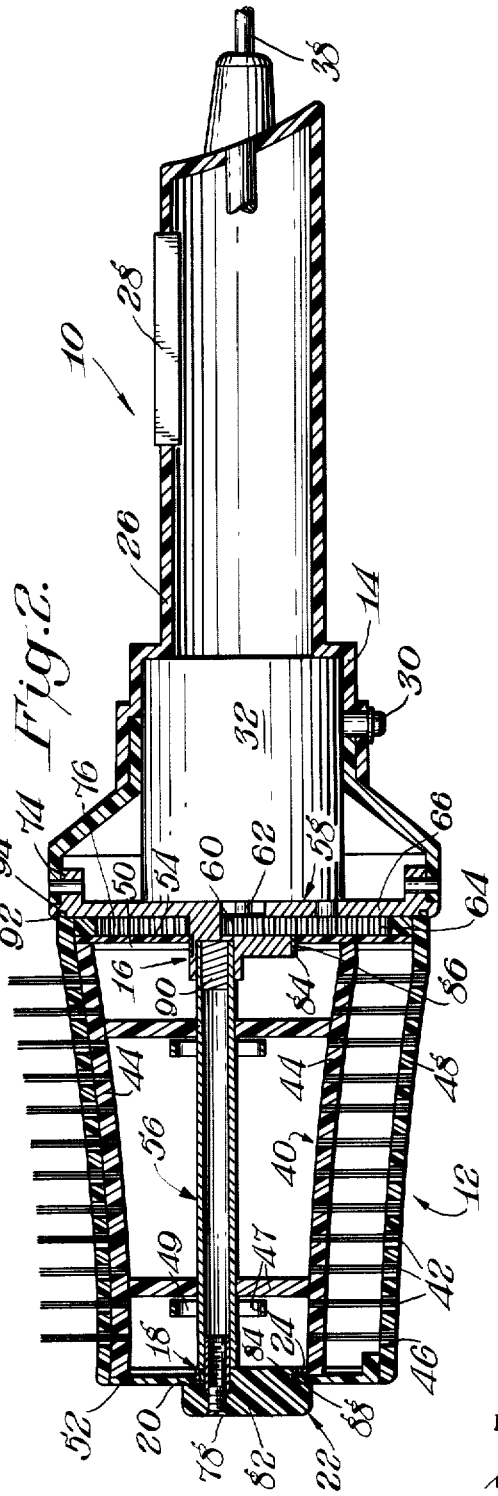
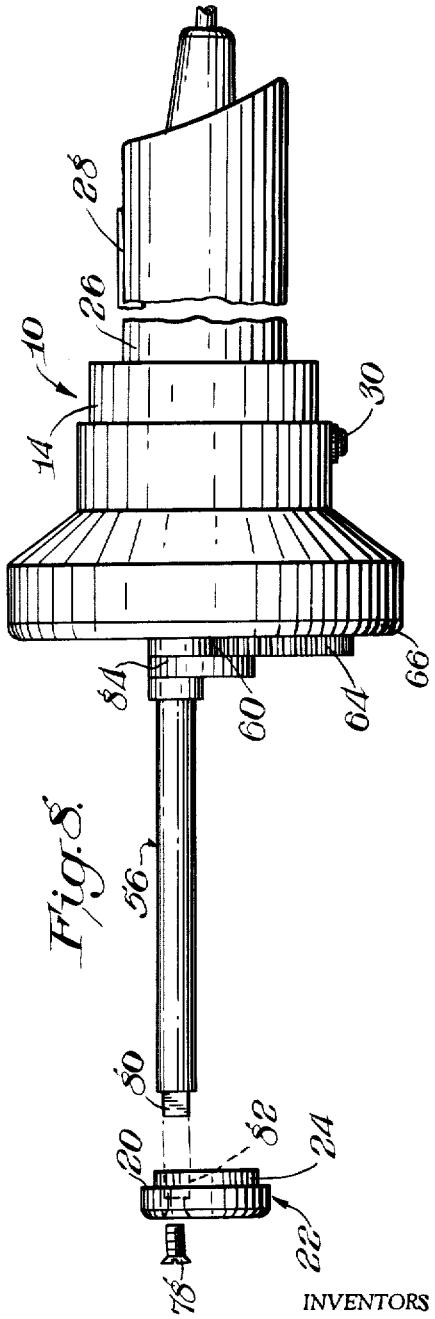
INVENTORS
William D. Taylor
LeRoy W. Crookes
BY Connolly and Hutz
ATTORNEYS

POWER-OPERATED HAIR BRUSH

Original Filed Dec. 14, 1962 3 Sheets-Sheet 3

INVENTORS
William D. Taylor
LeRoy. W. Crookes
BY Connolly and Hutz
ATTORNEYS

United States Patent Office

Re. 25,898
Reissued Nov. 9, 1965

25,898
POWER-OPERATED HAIR BRUSH

William D. Taylor, Coventry, Del., and Le Roy W. Crookes, Stamford, Conn., assignors to Ronson Corporation, Woodbridge, N.J., a corporation of New Jersey Original No. 3,150,393, dated Sept. 29, 1964, Ser. No. 244,817, Dec. 14, 1962. Application for reissue May 27, 1965, Ser. No. 460,617
15 Claims. (Cl. 15—23)

Matter enclosed in heavy brackets [ ] appears in the original patent but forms no part of this reissue specification; matter printed in italics indicates the additions made by reissue.

This invention relates to a power-operated hair brush, and it more particularly relates to such a brush having bristles which reciprocate in and out of a rotating drum.

An object of this invention is to provide a compact, simple and dependable power-operated hair brush which may be conveniently disassembled for cleaning and reassembled thereafter.

In accordance with this invention a brushing head including a perforated drum through which bristles are automatically extended and retracted is rotatably mounted upon a drive housing by open-ended trunnions. A detachable abutment axially retains the drum upon the drive housing, and its uncoupling permits the drum to be conveniently removed from the housing to facilitate its cleaning. A brush assembly is movably coupled with the drum and reciprocated as the drum rotates by its operative connection with a reaction element secured to the housing. The configuration of the brush assembly and its movable coupling retain it in position for convenient operative coupling with the reaction element even when the drum is disconnected from the housing. A detachable transmission connects the drum to a source of rotation within the drive housing. This highly facilitates removal, thorough cleaning and replacement of the drum and the brush assemblies mounted within it.

A particularly effective form of this invention is provided by respectively mounting inner and outer trunnion shafts directly upon and remote from the drive housing and connecting them by an extension shaft. This shaft may be eccentrically mounted within the drum and parallel to its axis of rotation to also serve as an eccentric reaction element by insertion through slotted yokes supporting brush bars in the brush assembly which are smoothly reciprocated as the drum rotates by scotch yoke action. Radial slots within the trunnion plates at the ends of the drum movably retain the ends of the brush bars, and a cap secured to the eccentric extension shaft may provide both the abutment for axially retaining the drum upon the drive housing, and also may itself comprise the outer trunnion shaft. When the cap is removed, the drum is easily longitudinally slid off the trunnions and the yokes of the brush assembly slid longitudinally off of the eccentric shaft to allow the drum and brush assemblies to be thoroughly washed and cleaned through the ample end holes provided by the trunnion bearings. The brush head and drum may then easily be longitudinally slid back upon the drive housing and the eccentric shaft and retained in engagement with them by replacement of the end cap.

Novel features and advantages of the present invention will become apparent to one skilled in the art from a reading of the following description in conjunction with the accompanying drawings wherein similar reference characters refer to similar parts and in which:

FIG. 2 is a cross sectional view taken through FIG. 3 along the line 2—2;

FIG. 8 is an exploded and partially broken side view in elevation of the portion of the embodiment shown in FIG. 1 remaining when the brushing head shown in FIG. 7 is removed.

Figures 1, 7:
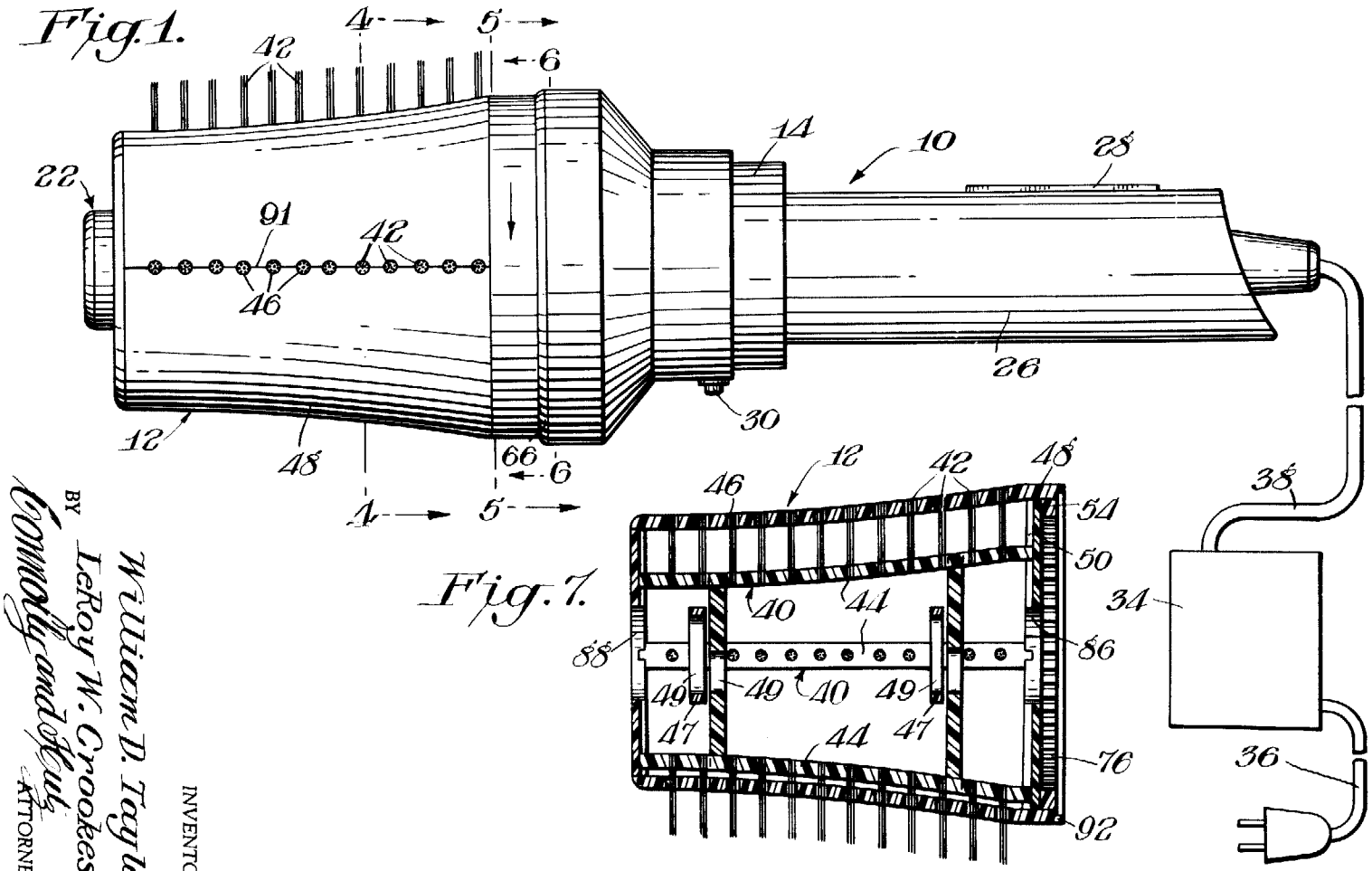
FIG. 1 is a side view in elevation of one embodiment of this invention.
FIG. 7 is a cross sectional view in elevation of an assembled brushing head removed from the embodiment shown in FIGS. 1 and 2.
Figure 3:
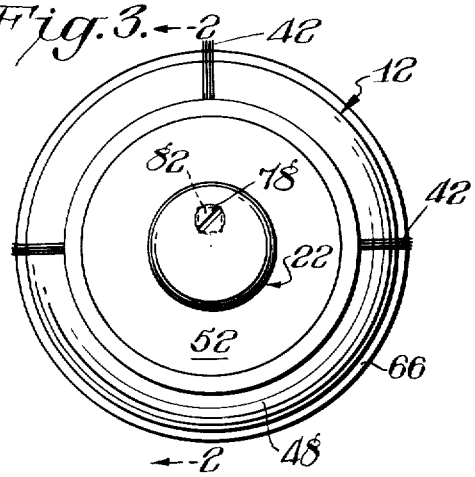
FIG. 3 is a front end view of the embodiment shown in FIG. 1.

In FIGS. 1–6 is shown a power-operated hair brush 10 including a brush head 12, shown alone in FIG. 7, which is rotatably and detachably mounted upon a drive housing 14 by a pair of open ended trunnions 16 and 18. Head 12 is axially retained upon drive housing 14 and trunnions 16 and 18 by a detachable abutment 20 on detachable cap 22 whose smaller diameter section 24 provides the shaft portion of outer trunnion 18. A means for grasping brush 10 is provided by handle 26 connected to drive housing 14, and a switch 28 biased to open in the absence of hand pressure is mounted on handle 26 for actuating rotation of brush head 12. A reversing switch 30 is also provided on a stationary portion of brush 10 for conveniently reversing the direction of rotation of brush head 12 while it is being used.

A source of rotation 32, which is for example an electric motor, is mounted within drive housing 14; and it may conveniently comprise a low voltage D.C. motor such as a 12 volt D.C. motor to minimize and practically eliminate any shock hazard. The power to operate motor 32 is for example provided from power pack 34 shown in FIG. 1, which is for example a center-tapped transformer and full wave rectifier circuit. Power pack 34 includes an electric cord and plug set 36 for connection to standard 110–120 volt A.C. and another cord and plug set 38 for connecting brush 10 to power pack 34. Brush 10 may also be operated by batteries for example of the nickel cadmium cell type, which for example might be inserted within handle 26 in flashlight manner; and it may also be conveniently made reversible by utilizing a capacitor run A.C. induction motor.

Brush head 12 as shown in FIGS. 2, 4, 5 and 7 incorporates a pair of brush assemblies 40 having bristles 42 mounted on brush bars 44 extending through holes or perforations 46 in drum 48. Drum 48 has an outer surface of revolution which is for example slightly curved to conform to the surface of the head and hair. It therefore presents no projections which might injure or hurt the head as drum 48 is rotated in a manner later described.

Brush assemblies 40 as shown in FIGS. 2 and 7 each incorporate a pair of diametrically opposed brush bars 44 connected by a pair of yokes 47 having elongated slots 49 within their central areas. Brush assemblies 44 are movably coupled within drum 48 by insertion of the outer ends of brush bars 44 within radial slots 50 in trunnion plates 52 and 54 connected to the ends of drum 48. The configuration of brush assemblies 40 and their movable coupling within the drum by slots 50 maintain them in operative position even when drum 48 is disconnected from drive housing 14 as shown in FIG. 7, which is later described in detail.

Figure 4:
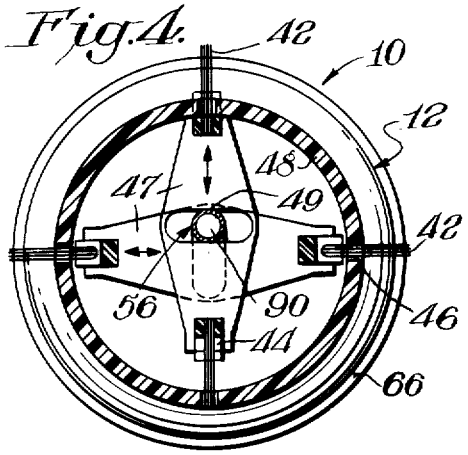
FIGS. 4–6 are cross sectional views taken through FIG. 1 along respective lines.
Figure 5:
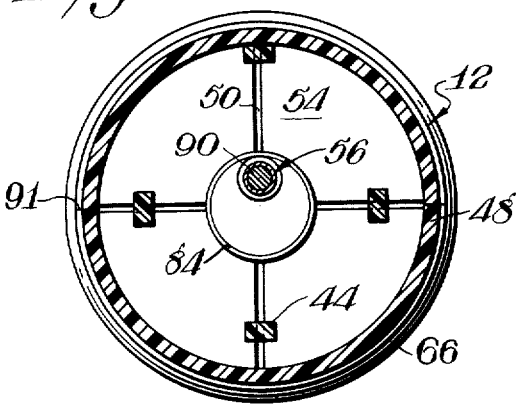
Figure 6:
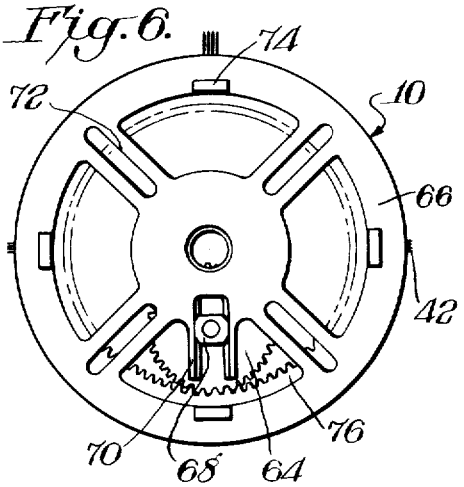

A reaction element 56 shown in FIGS. 2, 5, and 8 is secured to housing 14 and extends within drum 48 in engagement with brush assemblies 40 for reciprocating them and attached bristles 42 in and out of holes 46 in drum 48 as drum 48 rotates. Reaction element 56 also acts as an extension shaft between inner trunnion shaft 16 connected to housing 14 and outer trunnion shaft 24 which is part of cap 22. Shaft 56 is also eccentrically mounted within drum 48 and inserted through elongated slots 49 in yokes 47 for smoothly reciprocating brush assemblies 40 by scotch yoke action in conjunction with the sliding coupling of the ends of brush bars 44 in radial slots 50 of trunnion plates 52 and 54 as drum 48 rotates. FIGS. 2, 4 and 5 show how brush head 12 is mounted upon drive housing 14 and its reaction element 56, whereas FIGS. 7 and 8 respectively show brush head 12 and the remaining portion of brush 10 including drive housing 14 when brush head 12 is removed from it.

A detachable motion-transmission 58 connects brush head 12 to motor 32, and it comprises a gear train including a pinion 60 mounted upon shaft 62 of motor 32, an idler gear 64 rotatably mounted upon housing end plate 66 by retainer 68 adjustably secured to slotted arm 70 on plate 66. Plate 66 also includes a number of slotted motor support arms 72 for securing motors of various sizes to it. Lugs 74 secure plate 66 to drive housing 14. The last gear in train 58 transmitting motor rotation to brush head 12 comprises an internal annular gear 76 secured within the end of drum 48 adjacent drive housing 14 which detachably engages idler gear 64 secured to housing 14.

As shown in FIGS. 7 and 8, brush head 12 may be easily detached from drive housing 14 by removing screw 78 through cap and trunnion shaft unit 22 and the square end 80 of shaft 56. When square end 80 is inserted within corresponding square hole 82 in cap 22, it secures outer trunnion shaft 24 against rotation with respect to eccentric shaft 56. When cap 22 is removed, brush head 12 is easily slid longitudinally away from drive housing 14 and off of open-ended trunnion shaft 16, which is connected to plate 66 by being incorporated as part thereof. When plate 66 and trunnion shaft 16 are cast of aluminum and all portions of brush head are made of a strong plastic such as nylon, a wear-resisting ring 84 for example made of steel forms the trunnion bearing shaft surface to prevent the trunnion bearing hole 86 in drum end plate 54 from cutting into inner trunnion bearing shaft 16.

Cap 22 is economically made of a plastic such as nylon with trunnion shaft surface 24 being covered by another wear-resisting steel ring 84. This provides a self-lubricating outer trunnion bearing with outer bearing hole 88 in outer end of trunnion plate 52. The use of nylon on steel in all active bearing surfaces dispenses with the necessity for any supplemental lubrication, and avoids any need to lubricate after washing. Drum 48 is made for example in two longitudinal sections joined at parting lines 91 through holes 46 to facilitate assembly. It can also be made in four longitudinal sections to further facilitate assembly.

Shaft 56 is for example secured to drive housing 14 by press fitting of its plugged end 90 within an eccentric hole within inner trunnion shaft section 16.

When drum 12 is mounted upon drive housing 14, its inner end is movably interlocked with the outer periphery of plate 66 by insertion of projection 92 on drum 48 within corresponding groove 94 in plate 66. This interlocking prevents any hair from entering inbetween adjacent ends of drum 48 and drive housing 14 because hair cannot ordinarily make more than one bend when unsupported.

In FIG. 7 brush head 12 is shown removed from the portion of brush 10 shown in FIG. 8 to illustrate how the configuration of brush assemblies 40 and coupling of the ends of brush bars 44 within radial slots 50 maintains the internal parts of brush head 12 in operative relationship for convenient replacement upon the portion of brush 10 shown in FIG. 8. Although as shown in FIG. 7, the brush assembly 40 having its bristles extending upwardly and downwardly drops by gravity to a position below normal, upper bristles 42 are still inserted within holes 46, and both brush assemblies 40 themselves are maintained in substantial operative alignment within drum 48. This facilitates replacement of head 12 upon drive housing 14 and the insertion of eccentric shaft 56 within slots 49 in yokes 47 to restore brush assemblies 40 to their operating condition. Brush head 12 can for example be completely made of a non-corrosive material such as nylon plastic exclusive of the bristles or even inclusive of them if desired. It therefore can be thoroughly washed and cleaned through the ample trunnion bearing holes 86 and 88 at the inner and outer ends of drum 48.

When brush head 12 is assembled upon drive housing 14 as shown in FIGS. 1 and 2, motor 32 rotates head 12 and its drum 48 to translate the bristles relative to a head of hair. As drum 48 rotates, bristles 42 are reciprocated into and out of holes 46 in drum 48 to prevent them from becoming entangled in the hair. The extent of movement of bristles 42 by the scotch yoke action provided by the insertion of eccentric shaft 56 within yokes 47 of brush assemblies 40 moves the bristles from the fully inserted position shown at the bottom of FIG. 2 and the top of FIG. 7 to the fully extended position shown at the top of FIG. 2 and the bottom of FIG. 7 with intermediate degrees of extension of bristles 42 therebetween. A complete cycle of rotation for brush head 12 is therefor required to provide a complete extension and retraction of bristles 42. Since a pair of brush assemblies 40 are provided, four rows of bristles 42 extend from opposite sides of each brush assembly equally spaced about the outer periphery of brush head 12. As previously mentioned, these bristles and the internal portions of brush head 12 which are likely to clog with dandruff, grease and hair oils may be easily removed as a unit with brush head 12 as shown in FIG. 7 and washed and thoroughly cleaned.

Although ordinary 110 volt A.C. power might be used to rotate motor 32, the use of low voltage D.C. completely eliminates any shock hazard which is important when such an appliance is used in humid and wet bathroom atmospheres. Switch 28 is resiliently biased to open if handle 26 is released thereby immediately stopping rotation of brush head 12 should an operator lose complete control of brush 10. Reversing switch 30 can be conveniently actuated by the thumb of a hand holding handle 26 to conveniently permit the direction of rotation of brush head 12 to be reversed after it reaches the end of a stroke in one direction over the hair. This permits reversed stroking without lifting the brush away from the hair thereby eliminating any waste motion in brushing hair or stimulating the scalp.

What is claimed is:

1. A power-operated hair brush comprising a drive housing; manual grasping means upon said housing; a brushing head; a reaction element secured to said housing; open-ended trunnion means rotatably mounting said brushing head upon said housing;

said brushing head comprising a perforated drum having an outer surface of revolution, a brush assembly means incorporating bristles which extend through the holes in said drum, coupling means mounting said brush assembly means within said drum, and said coupling means maintaining said brush assembly means in position for operative engagement with said reaction element when said drum and brush assembly means are removed from said housing;

a source of rotation in said drive housing; detachable motion-transmitting means connecting said drum to said drive housing for rotating said drum; said reaction element extending within said drum in engagement with said brush assembly means for reciprocating its bristles through the holes in said drum as said drum rotates; and a detachable abutment means axially retaining said brushing head upon said drive housing and said open-ended trunnion means, the detachment of said abutment means permitting said brushing head to be conveniently removed and replaced whereby its cleaning is facilitated.

2. A hair brush as set forth in claim 1 wherein portions of said open-ended trunnion means comprise an inner and an outer trunnion shaft, said reaction element connecting said inner and said outer trunnion shaft to each other within said drum to form an extension shaft, a cap, and said detachable abutment means removably securing said cap to the end of said reaction element.

3. A hair brush as set forth in claim 2 wherein said cap and said portion of said trunnion means which comprises said outer trunnion shaft are combined in a unit.

4. A hair brush as set forth in claim 2 wherein said trunnion means includes trunnion plates at the ends of said drum, said coupling means comprising radial slots within said trunnion plates, said brush assembly means being engaged in said radial slots, and said trunnion plates incorporating trunnion bearing holes for engaging said trunnion shaft and providing convenient access to the interior of said drum for cleaning said brushing head.

5. A hair brush as set forth in claim 2 wherein said extension shaft is eccentrically mounted within said drum parallel to its axis of rotation, said brush assembly means comprising diametrically opposed brush bars to which said bristles are attached, said brush bars being connected by yokes having a diametric length which permits said bristles on one of said brush bars to extend a maximum distance through the holes in one side of said drum while the bristles on the diametrically opposite brush bar are retracted within said casing but still inserted within said holes; and said yokes each incorporating a slot through which said reaction element extension bar is inserted for reciprocating said brushing assemblies by scotch yoke action while said drum is rotating.

6. A hair brush as set forth in claim 5 wherein two of said brush assembly means, each incorporating a pair of said brush bars and arranged at right angles to each other, are mounted within said drum.

7. A hair brush as set forth in claim 1 wherein a relatively movable interlocking projecting and groove means connects adjacent ends of said drum and said drive housing to prevent hair from entering therebetween into said drum.

8. A hair brush as set forth in claim 1 wherein said source of rotation is reversible, and a reversing switch is provided upon said housing for conveniently changing the direction of rotation of said brushing head as it is being used.

9. A hair brush as set forth in claim 1 wherein said source of rotation comprises a low-voltage D.C. motor to minimize any danger from electric shock.

*10. A power-operated hair brush comprising:*

*(a) a drive housing;*

*(b) manual grasping means upon said housing;*

*(c) a brushing head comprising:*

*(1) a perforated drum having an outer surface of revolution,*

*(2) brush assembly means incorporating bristles adapted to extend through the holes in said drum, and*

*(3) coupling means mounting said brush assembly means within said drum for rotation therewith;*

*(d) mounting means for rotatably mounting said brushing head upon said housing;*

*(e) a source of rotation in said drive housing;*

*(f) motion transmitting means connecting said drum to said drive housing for rotating said drum about a predetermined axis;*

*(g) a reaction element rigidly secured at one end to said housing and extending within said drum along a direction offset from said predetermined axis and in operative engagement with said brush assembly means for reciprocating its bristles through the holes in said drum as said drum rotates; and*

*(h) means located at a position remote from the outer surface of revolution of said drum for axially retaining said brushing head upon said drive housing and mounting means.*

*11. A power-operated hair brush comprising:*

*(a) a drive housing;*

*(b) manual grasping means upon said housing;*

*(c) a brushing head comprising:*

*(1) a perforated drum having an outer surface of revolution,*

*(2) brush assembly means incorporating bristles adapted to extend through the holes in said drum, and*

*(3) coupling means mounting said brush assembly means within said drum for rotation therewith;*

*(d) trunnion means rotatably mounting said brushing head upon said housing;*

*(e) a source of rotation in said drive housing;*

*(f) motion transmitting means connecting said drum to said drive housing for rotating said drum about a predetermined axis;*

*(g) a reaction element rigidly secured at one end to said housing and extending within said drum along a direction offset from said predetermined axis and in operative engagement with said brush assembly means for reciprocating its bristles through the holes in said drum as said drum rotates; and*

*(h) abutment means connected to the other end of said reaction element for axially retaining said brushing head upon said drive housing and trunnion means.*

*12. A hair brush as set forth in claim 11 wherein:*

*(a) said trunnion means includes:*

*(1) an inner and outer trunnion shaft, and*

*(2) trunnion plates at the ends of said drum having trunnion bearing holes for engaging said trunnion shafts; and*

*(b) said coupling means comprises radial slots within said trunnion plates, with said brush assembly means being engaged in said radial slots.*

*13. A power-operated hair brush comprising:*

*(a) a drive housing;*

*(b) manual grasping means upon said housing;*

*(c) a brushing head comprising:*

*(1) a perforated drum having an outer surface of revolution,*

*(2) brush assembly means incorporating bristles adapted to extend through the holes in said drum and including diametrically opposed brush bars to which said bristles are attached, said brush bars being connected by slotted yokes having a diametric length which permits said bristles on one of said brush bars to extend a maximum distance through the holes in one side of said drum while the bristles on the diametrically opposite brush bar are retracted within said drum but still inserted within said holes, and*

*(3) coupling means mounting said brush assembly means within said drum for rotation therewith;*

*(d) trunnion means for rotatably mounting said brushing head upon said housing and comprising:*

*(1) an inner and outer trunnion shaft, and*

*(2) trunnion plates at the ends of said drum having trunnion bearing holes for engaging said trunnion shafts;*

*(e) a source of rotation in said drive housing;*

*(f) motion transmitting means connecting said drum to said drive housing for rotating said drum about a predetermined axis;*

*(g) a reaction element comprising an extension shaft rigidly secured at one end to said housing and eccentrically mounted within said drum parallel to said predetermined axis and extending through the slots of said yokes for reciprocating said brush assembly means by scotch yoke action as said drum rotates; and*

*(h) abutment means connected to the other end of said reaction element for axially retaining said brushing head upon said drive housing and trunnion means.*

*14. A hair brush according to claim 13 wherein:*

*(a) said coupling means comprises radial slots within said trunnion plates, with said brush assembly means being engaged in said radial slots.*

*15. A hair brush as set forth in claim 14 wherein:*

*(a) two of said brush assembly means each incorporating a pair of said brush bars arranged at right angles to each other are mounted within said drum.*

References Cited by the Examiner

The following references, cited by the Examiner, are of record in the patented file of this patent or the original patent.

UNITED STATES PATENTS

| | | | |
|---|---|---|---|
| 1,107,633 | 8/14 | Thomas | 15—383 X |
| 3,019,463 | 2/62 | Mitchell | 15—23 |

CHARLES A. WILLMUTH, *Primary Examiner.*

ERNEST L. ROBERTS, *Examiner.*